United States Patent
Ng et al.

(10) Patent No.: US 10,350,824 B2
(45) Date of Patent: Jul. 16, 2019

(54) CANTILEVER SUPPORT OF PRINTHEAD MODULE FOR ADDITIVE MANUFACTURING SYSTEM

(71) Applicant: Applied Materials, Inc., Santa Clara, CA (US)

(72) Inventors: Hou T. Ng, Campbell, CA (US); Raanan Zehavi, Cupertino, CA (US); Nag B. Patibandla, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 287 days.

(21) Appl. No.: 15/265,631

(22) Filed: Sep. 14, 2016

(65) Prior Publication Data
US 2017/0072643 A1 Mar. 16, 2017

Related U.S. Application Data

(60) Provisional application No. 62/262,667, filed on Dec. 3, 2015, provisional application No. 62/219,605, filed on Sep. 16, 2015.

(51) Int. Cl.
B29C 67/00 (2017.01)
B29C 64/153 (2017.01)
(Continued)

(52) U.S. Cl.
CPC ........... B29C 64/153 (2017.08); B29C 64/20 (2017.08); B29C 64/386 (2017.08); B33Y 30/00 (2014.12);
(Continued)

(58) Field of Classification Search
CPC .................. B22F 3/003; B22F 3/1055; B22F 2003/1056; B33Y 10/00; B33Y 30/00;
(Continued)

(56) References Cited

U.S. PATENT DOCUMENTS 6,046,426 A * 4/2000 Jeantette ............ B01F 13/0255
                                                    219/121.63
6,092,941 A 7/2000 Imai
(Continued)

FOREIGN PATENT DOCUMENTS

CN 102463746 5/2012
CN 103717378 4/2014
(Continued)

OTHER PUBLICATIONS

International Search report and Written Opinion in International Application No. PCT/US2016/051766, dated Dec. 23, 2016, 12 pages.
(Continued)

Primary Examiner — Joseph S Del Sole
Assistant Examiner — Lawrence D. Hohenbrink, Jr.
(74) Attorney, Agent, or Firm — Fish & Richardson P.C.

(57) ABSTRACT

An additive manufacturing system includes a platen having a top surface to support an object being manufactured, a support that is movable along a vertical axis, an actuator to move the support along the vertical axis, a dispenser to deliver a plurality of successive layers of feed material over the platen, an energy source configured to fuse at least a portion of the feed material, and a controller. The dispenser and energy source are mounted on the support over the platen such that motion of the support along the vertical axis moves the dispenser and energy source together toward or away from the top surface of the platen. The controller is coupled to the actuator, dispenser and energy source and configured to cause the actuator to move the support to lift the dispenser and actuator away from the top surface after each of the plurality of successive layers is delivered.

15 Claims, 7 Drawing Sheets

(51) Int. Cl.
  B33Y 30/00 (2015.01)
  B33Y 50/02 (2015.01)
  B29C 64/386 (2017.01)
  B29C 64/20 (2017.01)
  B29C 64/336 (2017.01)
  B29C 64/264 (2017.01)
  B29C 64/205 (2017.01)
  B29C 64/165 (2017.01)
  B29C 64/295 (2017.01)
  B29C 64/209 (2017.01)
  B29C 64/307 (2017.01)
  B22F 3/105 (2006.01)
  B33Y 10/00 (2015.01)
  B22F 3/00 (2006.01)
  B33Y 70/00 (2015.01)

(52) U.S. Cl.
  CPC ............... B33Y 50/02 (2014.12); *B22F 3/003* (2013.01); *B22F 3/1055* (2013.01); *B22F 2003/1056* (2013.01); *B29C 64/165* (2017.08); *B29C 64/205* (2017.08); *B29C 64/209* (2017.08); *B29C 64/264* (2017.08); *B29C 64/295* (2017.08); *B29C 64/307* (2017.08); *B29C 64/336* (2017.08); *B33Y 10/00* (2014.12); *B33Y 70/00* (2014.12); *Y02P 10/295* (2015.11)

(58) Field of Classification Search
  CPC ....... B33Y 50/02; B33Y 70/00; Y02P 10/295; B29C 64/264; B29C 64/295; B29C 64/205; B29C 64/336; B29C 64/165; B29C 64/209; B29C 64/307; B29C 64/153
  USPC .......................... 425/174.4, 375, 78; 264/308
  See application file for complete search history.

(56) References Cited

U.S. PATENT DOCUMENTS

| | | | |
|---|---|---|---|
| 8,454,345 B2 | 6/2013 | Silverbrook | |
| 8,951,786 B1 * | 2/2015 | Dosier | B28B 17/00 435/289.1 |
| 9,533,350 B2 | 1/2017 | Zhuang et al. | |
| 9,764,515 B2 | 9/2017 | Yost et al. | |
| 10,007,253 B2 | 6/2018 | Hotta | |
| 2004/0005374 A1 | 1/2004 | Narang et al. | |
| 2005/0158107 A1 | 7/2005 | Acher | |
| 2005/0191016 A1 | 9/2005 | Ishikawa | |
| 2005/0280185 A1 * | 12/2005 | Russell | B28B 1/001 264/308 |
| 2008/0250953 A1 | 10/2008 | Whelan | |
| 2012/0105534 A1 | 5/2012 | Boday et al. | |
| 2013/0186514 A1 * | 7/2013 | Zhuang | B22F 1/0003 141/11 |
| 2014/0232035 A1 | 8/2014 | Bheda | |
| 2014/0271328 A1 * | 9/2014 | Burris | B23K 26/034 419/53 |
| 2014/0306379 A1 | 10/2014 | Hartmann et al. | |
| 2015/0120033 A1 * | 4/2015 | Hotta | B29C 64/112 700/119 |
| 2015/0174824 A1 | 6/2015 | Gifford et al. | |
| 2015/0190963 A1 | 7/2015 | Lee et al. | |
| 2017/0021456 A1 * | 1/2017 | Varetti | B29C 35/0805 |
| 2017/0036404 A1 | 2/2017 | Rengers et al. | |
| 2017/0057013 A1 | 2/2017 | Gillespie et al. | |
| 2018/0222114 A1 | 8/2018 | Ng et al. | |
| 2018/0222116 A1 | 8/2018 | Ng et al. | |

FOREIGN PATENT DOCUMENTS

| | | |
|---|---|---|
| CN | 103802318 | 5/2014 |
| CN | 103802322 | 5/2014 |
| CN | 203937195 | 11/2014 |
| CN | 204018721 | 12/2014 |
| CN | 204235896 | 4/2015 |
| CN | 104708819 | 6/2015 |
| EP | 1631439 | 8/2007 |
| WO | WO 2015/038072 | 3/2015 |

OTHER PUBLICATIONS

Partial Supplementary European Search Report in Application No. 16847247.0, dated Apr. 23, 2019, 16 pages.

* cited by examiner

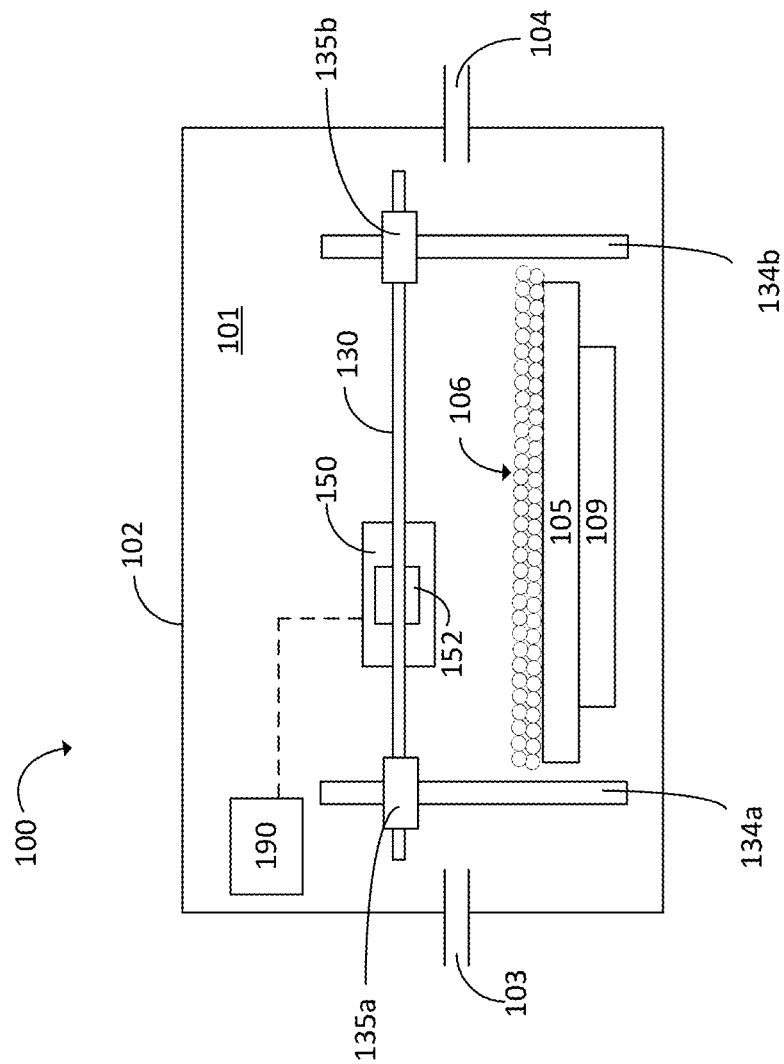
FIG. 1A
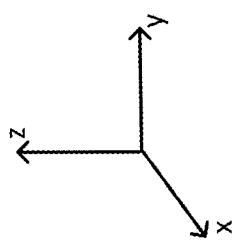

CANTILEVER SUPPORT OF PRINTHEAD MODULE FOR ADDITIVE MANUFACTURING SYSTEM

CROSS-REFERENCE TO RELATED APPLICATIONS

This application claims priority to U.S. Provisional Application Ser. No. 62/262,667, filed on Dec. 3, 2015, and claims priority to U.S. Provisional Application Ser. No. 62/219,605, filed Sep. 16, 2015, the entire contents of each being incorporated by reference.

TECHNICAL FIELD

This invention relates to additive manufacturing, and more particularly to a 3D printing process in which a layer of powder is dispensed.

BACKGROUND

Additive manufacturing (AM), also known as solid freeform fabrication or 3D printing, refers to any manufacturing process where three-dimensional objects are built up from raw material (generally powders, liquids, suspensions, or molten solids) in a series of two-dimensional layers or cross-sections. In contrast, traditional machining techniques involve subtractive processes and produce objects that are cut out of a stock material such as a block of wood or metal.

A variety of additive processes can be used in additive manufacturing. The various processes differ in the way layers are deposited to create the finished objects and in the materials that are compatible for use in each process. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g. stereolithography (SLA).

Sintering is a process of fusing small grains, e.g., powders, to create objects. Sintering usually involves heating a powder. When a powdered material is heated to a sufficient temperature in a sintering process, the atoms in the powder particles diffuse across the boundaries of the particles, fusing the particles together to form a solid piece. In contrast to melting, the powder used in sintering need not reach a liquid phase. As the sintering temperature does not have to reach the melting point of the material, sintering is often used for materials with high melting points such as tungsten and molybdenum. Both sintering and melting can be used in additive manufacturing.

Conventional powder-based additive manufacturing systems can deposit a layer of powdered material on a stage. A laser beam or electron beam is used as the energy source for sintering or melting the powdered material and typically the beam is directed on a selected point in a layer of the powdered material and raster scanned with activation at selected locations across the layer. Once all the selected locations on the first layer are sintered or melted, the stage is lowered and a new layer of powdered material is deposited on top of the completed layer, and the process is repeated layer by layer until the desired object is produced.

SUMMARY

In one aspect, an additive manufacturing system includes a platen having a top surface to support an object being manufactured, a support that is movable along a vertical axis, an actuator to move the support along the vertical axis, a dispenser to deliver a plurality of successive layers of feed material over the platen, an energy source configured to fuse at least a portion of the feed material, and a controller. The dispenser and energy source are mounted on the support over the platen such that motion of the support along the vertical axis moves the dispenser and energy source together toward or away from the top surface of the platen. The controller is coupled to the actuator, dispenser and energy source and configured to cause the actuator to move the support to lift the dispenser and actuator away from the top surface after each of the plurality of successive layers is delivered.

Features may include one or more of the following. The platen may be configured to be vertically immobile. The controller may be configured to cause the actuator to move the support by distance approximately equal to a thickness of a fused portion of a layer. The support may be movable along a horizontal axis. The system may include a second actuator to move the support along the horizontal axis, the controller may be coupled to the second actuator, and the controller may be configured to cause the second actuator to move the support along the horizontal axis to scan the dispenser across the top surface of the platen while a layer of the feed material is delivered. The platen may be configured to be horizontally immobile.

The support may include a platform extending horizontally over the platen, and the platform may be supported on and movable along horizontal rails on opposite sides of the platen. The horizontal rails may be supported and movable along vertical rails on opposite sides of the platen. A frame may hold the dispenser and the energy source, and the frame may fit in an aperture in the platform. The support may be supported on and movable along one or more horizontal rails on one side of the platen. The one or more horizontal rails may be supported and movable along one or more vertical rails on the one side of the platen. A frame may hold the dispenser and the energy source, and the support may include a substantially vertical plate, and a vertical side panel of the frame may be mechanically fixed to the vertical plate.

The support and actuator may include a robot having a movable robot arm. The robot may be a 6-axis robot.

A heat source may be configured to heat the layer to a temperature below a temperature at which the feed material fuses, and the heat source may be mounted on the support. The heat source may include an array of heat lamps. A roller or blade extending along the second axis may be configured to smooth the layer of feed material, and the roller or blade may be mounted on the support.

In another aspect, an additive manufacturing system includes a platen having a top surface to support an object being manufactured, a support that is movable along a horizontal axis, the support including a vertical plate, an actuator to move the support along the horizontal axis, a first frame, a first dispenser mounted on the first frame to deliver a plurality of successive layers of feed material over the platen, a second frame, a second dispenser mounted on the second frame to deliver a plurality of successive layers of feed material over the platen, and an energy source configured to fuse at least a portion of the feed material. The first frame has a first vertical side panel and a second vertical side panel on a side of the first frame opposite the first vertical side panel, the first vertical side panel of the first frame is mechanically fixed to the support. The second frame has a first vertical side panel mechanically fixed to the second vertical side panel of the first frame such that the first frame and the second frame are held in a cantilever arrangement over the platen. Motion of the support along the horizontal axis scans the first dispenser and second dispenser together along the horizontal axis across the top surface of the platen.

Features may include one or more of the following. The vertical plate, first frame and the second frame may be positioned in order along a line perpendicular to the horizontal axis, such that the first dispenser is configured to deliver the plurality of successive layers of feed material to a first portion of the platen and the second dispenser is configured to deliver the plurality of successive layers of feed material to a second portion of the platen extending parallel to the first portion.

The energy source may include a first energy source mounted on the first frame to fuse feed material on the first portion of the platen and a second energy source mounted on the second frame to fuse feed material on the second portion of the platen. A heat source may be configured to heat the layer to a temperature below a temperature at which the feed material fuses, and the heat source may be mounted on the support. The heat source may include a first heat source mounted on the first frame to heat feed material on the first portion of the platen and a second heat source mounted on the second frame to heat feed material on the second portion of the platen. Each heat source may include an array of heat lamps.

Advantages of the foregoing may include, but are not limited to, the following. It can be desirable to adjust the distance between the components of the additive manufacturing system, e.g., the feed material dispenser and energy source (which can be arranged in a printhead module), and the layer of feed material that is being processed. By maintaining a constant distance between these components and the layer of feed material being processed, the quality of the additive manufacturing process can be improved, e.g., reliability of fusing selected locations, uniformity of dispensed layer thickness uniformity of material characteristics of the fused material can be improved.

As the throughput and the build bed size of the additive manufacturing process increases, moving the platen that supports the feed material can become challenging. Therefore, it is desirable to keep the platen fixed, and to move the printhead modules, either towards or away from the platen, during the additive manufacturing process. This can permit extremely bulky components, e.g., on the order of one ton or more, to be fabricated by additive manufacturing.

The details of one or more implementations are set forth in the accompanying drawings and the description below. Other potential features, aspects, and advantages will become apparent from the description, the drawings, and the claims.

DESCRIPTION OF DRAWINGS

FIG. 1A illustrates a schematic side view of an exemplary additive manufacturing system.

Like reference numbers and designations in the various drawings indicate like elements.

DETAILED DESCRIPTION

Figure 1B:
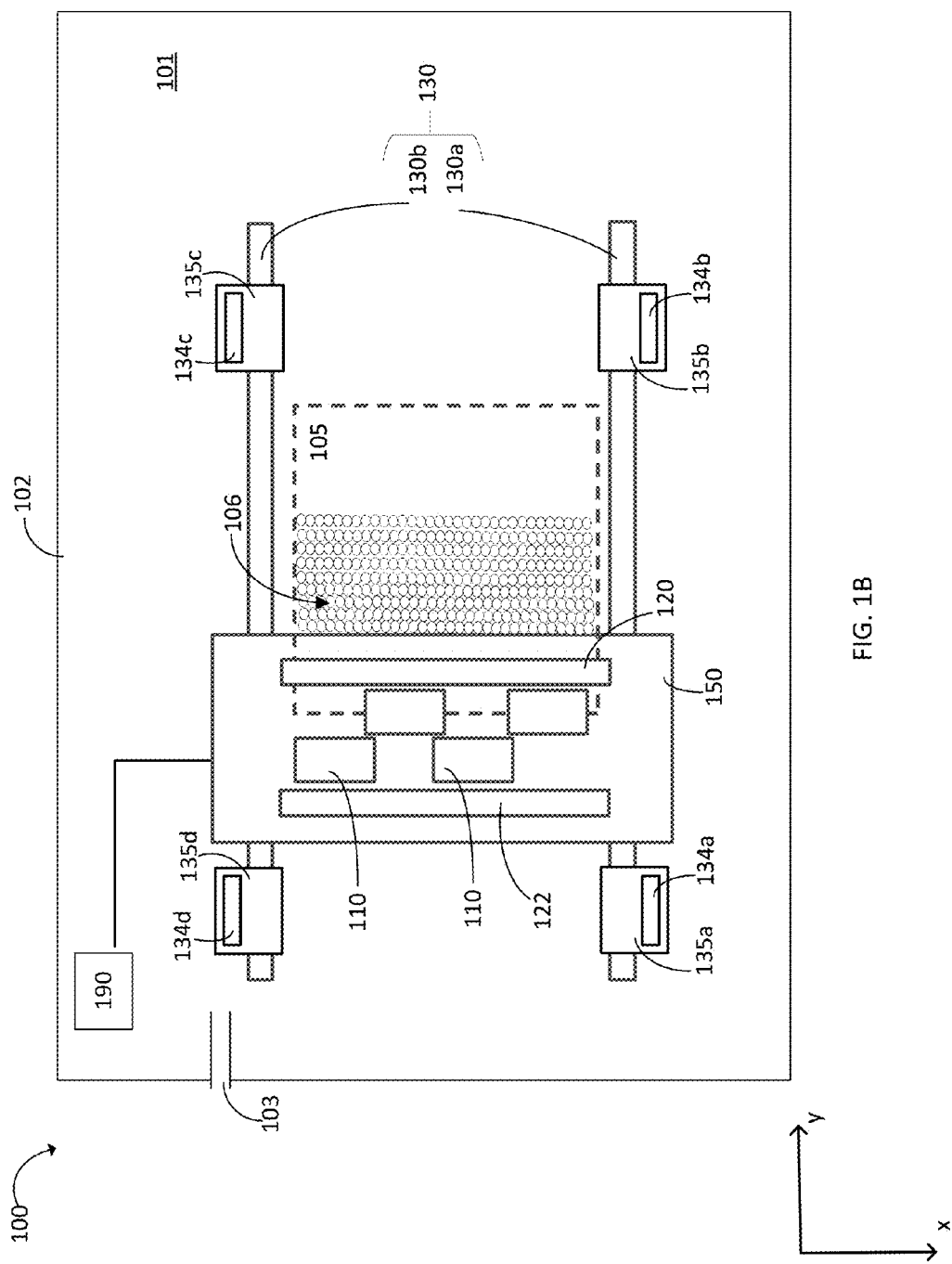
FIG. 1B is a top view of the additive manufacturing system illustrated in FIG. 1A.

An additive manufacturing system includes a dispenser to deposit a layer of feed material (for example, powders, liquids, suspensions, molten solids) on a platen, and an energy source to fuse portions of the layer of feed material. It is desirable that the distance between the dispenser/energy source and the layer of feed material facing the dispenser and energy source module (henceforth called "facing surface") remains unchanged from layer-to-layer during the manufacturing process. For example, if the distance from the energy source and the facing surface changes, then the amount of power required to fuse the feed material can change, which can reduce reliability of the fusing step. It may also be desirable to adjust the distance between the energy source (for example, a laser) and the facing surface to ensure that the energy source is not out of focus at the facing surface. As another example, if the distance from the dispenser and the facing surface changes, distribution of the feed material onto the facing surface can be affected, which can reduce reliability of the dispensing step.

If the platen (on which the feed material is deposited) and the dispenser and energy source are vertically adjusted during the manufacturing process, the distance between the dispenser or energy source and the facing surface may decrease with the deposition and processing of a new layer of feed material. For example, the decrease in the distance between the dispenser or energy source module and the facing surface may decrease by the thickness of the newly deposited and processed layer of feed material, if the platen is not moved.

It may be desirable that the thickness of the newly deposited layer changes from one region of the platen to another. In such a case, vertical distance between the dispenser/energy source may need to be adjusted while a newly deposited layer is being processed.

The distance between the printhead module and the facing surface of feed material can stay constant from layer-to-layer if after the deposition a new layer of feed material, the relative distance between the platen and the dispenser or energy source module is increased by the thickness of the new layer of feed material. This can be achieved by either moving the platen or a frame that supports the dispenser and energy source away from one another by a distance that corresponds to the thickness of the newly deposited layer of feed material.

As the size of the platen increases to support bigger build bed size of manufacturing process, it can become challenging to move the platen during the manufacturing process. For example, the weight of the platen along with the deposited feed material can be substantial which can render moving the platen unfeasible. For example, a jet engine part might weigh hundreds of pounds. Also, it can become challenging to adjust the vertical position of the entire platen with a precision that is desirable for the manufacturing process. Therefore, the additive manufacturing system can be configured to move the dispenser and energy source. This can be achieved by a mechanism, for example a gantry, a cantilever mounting, or a robot arm, that can move the dispenser and energy source. For example, the dispenser and energy source can be configured to move both parallel to the platen or away from/towards the platen (for example, by a distance that corresponds to the thickness of a newly deposited layer of feed material) such that the distance between the dispenser and energy source and the facing surface can be adjusted from layer-to-layer processing of feed material or during the processing of a layer of feed material.

It may also be desirable to change the distance between the dispenser and energy source and the platen while a new layer of feed material is being processed. This may be desirable if the facing surface is not substantially parallel to the platen. For example, if the surface of the platen is uneven, or if thickness of the deposited layers is uneven (so that the distance between the facing surface and the platen varies along the surface of the platen), the dispenser and energy source may have to move relative to the platen to ensure that the distance between the dispenser and energy source and the facing surface remains unchanged during the manufacturing process.

FIGS. 1A and 1B illustrate a schematic of an exemplary additive manufacturing system 100. The system 100 can include and be enclosed by a housing 102. The housing 102 can, for example, allow a vacuum environment to be maintained in a chamber 101 inside the housing, e.g., pressures at about 1 Torr or below. Alternatively the interior of the chamber 101 can be a substantially pure gas, e.g., a gas that has been filtered to remove particulates, or the chamber can be vented to atmosphere or be held at a positive pressure above atmosphere. The gas can enter the chamber 101, from a gas source (not shown), through a gas inlet 103, or through a gas knife. The gas knife can dispense inert gas at a substantially uniform flow rate across the width of the build bed stage. The gas knife can be movable along the z-axis. The gas knife can be integrated into printhead platform 150 or can be a separate unit. The gas from the chamber can be removed through a vacuum vent 104 that can be fixed or can move along the z-axis The system 100 includes a platen 105 that receives or supports the layer of feed material. The platen 105 can include or be placed above a heater 109, e.g., a resistive heater or a lower lamp array, which can heat the platen 105 and thus heat the feed material deposited on the platen 105.

A printhead platform/support 150 is positioned above the platen 105. The printhead platform 150 is configured to carry one or more printhead modules 110 (see FIG. 1B). Each printhead module is removably mounted on the platform 150. The printhead platform 150 can be supported by and form part of a gantry 130. An actuator system 152 allows the printhead platform 150 to move across the platen 105 (for example, along the y-axis). The gantry 130 is supported by vertical supports 134a and 134b, e.g., vertical rails or shafts. The vertical supports 134a and 134b are separate from and not mounted on the platen 105 and may not move relative to the platen 105. The supports 134a and 134b, and the platen 105 can be supported, for example, by the housing 102.

Actuators 135a and 135b can move the gantry 130 relative to the vertical supports 134a and 134b, respectively. For example, the actuators 135a, 135b can be in a sliding engagement with the vertical supports 134a and 134b. As a result the platform 150 can move along the z-axis, relative to the platen 105.

By adjusting the horizontal position of the platform 150 along the gantry 130, —by actuator 152—the platform 150 can be configured to move substantially parallel to the platen 105, for example, when the platform 150 is moving across the platen 105 performing the manufacturing process. Once the actuator 152 has scanned the platform 150 across the substrate and an entire layer of feed material has been deposited and processed by the platform 150, actuators 135a and 135b can move the gantry 130 (and hence the platform 150) relative to the platen 105 along the z direction by a distance that corresponds to the thickness of the layer of feed material that has been deposited and fused.

The platform 150 can include metrology system that can detect the distance between the platform 150 and the portion of the facing surface 106 of feed material deposited on the platen 105 that lies below the platform 150. The metrology system can, for example, be a photoelectric sensor or a laser sensor. As the platform slides across the platen 105 (along y-direction), the metrology system can periodically measure the distance between the platform 150 and the facing surface 106, and send information related to the measurement to a controller 190. If the facing surface 106 is uneven, i.e., the distance between the platform 150 and the facing surface 106 changes as the platform 150 slides over the platen 105, the metrology system will convey this information to the controller 190. The controller 190 may send a signal to the actuators 135a and 135b to adjust the gantry 130 such that distance between the platform 150 and the portion of the facing surface 106 that lies directly below the platform 150 remains unchanged as the platform slides over the platen 105 (along y-direction).

The controller 190 controls various aspects of the additive manufacturing process. For example, the controller 190 controls the actuator systems 152, 134a and 135b, and therefore the motion of the printhead platform 150. The controller 190 can also control the relative motion and operation of printhead modules 110 (see FIG. 1B) included in the printhead platform 150. The controller can also control the operation of various "global" printing components included in the printhead platform 150.

FIG. 1B is a top view of the exemplary additive manufacturing system 100 illustrated in FIG. 1A. The printhead platform 150 is slidably mounted on the horizontal supports 130a and 130b, e.g., rails or shafts, of the gantry 130. By sliding on the rails 130a and 130b of the gantry 130—for example, as driven the actuator 152 (shown in FIG. 1A)—the printhead platform 150 can traverse over the platen 105 (along y axis).

The rail 130a is supported by vertical supports 134a and 134b at its ends. The location of the ends of the rails 130a relative to supports 134a and 134b (along z-direction) can be controlled by actuators 135a and 135b, respectively. Similarly, the location of the ends of rail 130b relative to vertical supports 134c and 134d (along z-direction) can be controlled by actuators 135c and 135d, respectively.

Actuators 135a-d can be controlled by the controller 190. Controller 190 can also control the global printing components 122 and 120 in platform 150. The global printing components 120/122 can include a metrology system that can measure and convey information about the distance between the platform 150 and the facing surface 106 or temperature of the facing surface to the controller 190. The controller 190 can also control actuators 135a-d such that the distance between the platform 150 and the facing surface 106 remains unchanged as the platform slides over the platen 105 (along y direction) or after a layer of feed material has been deposited and processed. The controller 190 can also control spreaders (for example, a blade or a roller) that can be included in global printing component 122.

The printhead platform 150 can include one or more printhead modules 110. Each printhead module 110 can be removably mounted on the platform 150. For example, the printhead module can fit into an aperture in the printhead platform 150. "Removably mounted" in this context means that the printhead 110 can be installed such that the printhead 110 is mechanically held in a fixed position relative to the platform 150, but that the printhead 110 can be removed by use of standard hand-held construction tools, e.g., wrenches or power screwdrivers, and without damage to the printhead or the platform. For example, a frame of the printhead 110 can be secured by mechanical fasteners, e.g., nuts and bolts, to the platform 150. When an operator desires to remove the printhead 110, the bolts are loosened and the printhead is lifted out.

In addition, the printhead 110 and the components in the printhead, e.g., the dispenser, spreaders (for example, rollers or blades), heat source and energy source, are configured such that they can be mounted and dismounted as a single unit from the platform 150. This permits easier construction and repair of the additive manufacturing system 100.

As shown in FIG. 1B, multiple printhead modules 110 can be arranged in a staggered fashion so as to span the entire width of the platen 105. This permits a layer of the object to be fabricated with a single pass of the platform 150 over the platen 105. The printhead modules 110 perform the manufacturing process on rectangular strips of feed material deposited on the platen.

The platform 150 can also support global printing components 120 and 122. These global printing components are mounted directly on the platform 150, rather than on the frame of a printhead 110. Printing component 120 can be a global dispenser that can dispense and smooth the deposited feed material. In some implementation printing component 120 can also be a global metrology system, for example similar to global metrology system 122. The global metrology system can comprise one or more of a sensor, a thermal imager or an optical camera. Global printing components 120/122 can include an air knife that can dispense gas (for example, inert gas) into the chamber 101.

In one implementation, as the platform 150 moves from left to right (along +y direction) across the platen 105, a first global metrology system 120 forms the leading edge of the system, followed by the printhead modules 110 which in turn are followed by a second global metrology system 122 at the end. The global metrology system 120 at the leading edge of the system 150 can therefore measure the various parameters such as the temperature and/or vertical distance between the platform 150 and the facing surface 106.

The data from the metrology system(s) can be fed to the controller 190 to control operation of the printhead modules 110. For example, if the feed material dispenser is controllable, measurements of the distance between platform 150 and surface 106 can be used by the controller to determine an amount of material to dispense to improve layer thickness uniformity. Similarly, the data on the temperature of the layer can be used to control the power delivered to the heat source and/or energy source so that the portions to be fused are raised to a uniform temperature. The global metrology system 122 at the trailing edge of the system 150 can measure the various parameters associated with the additive manufacturing process, for example, the temperature and/or surface roughness of the fused/melted feed material. Again, this data can be fed to the controller 190 to control operation of the printhead modules 110, e.g., in a feedback/feedforward loop to provide improved uniformity and defect compensation.

In some implementations, the global metrology system 122 can be divided into several segments along the x direction such that each segment of the metrology system is responsible for taking measurements of feed material fused by one or more printhead modules.

In some implementations, the additive manufacturing process can be one-directional, i.e., the additive manufacturing process only occurs when the platform 150 is moving from left to right or from right to left. In another example, the additive manufacturing process can be bi-directional, i.e., the additive manufacturing process occurs when the platform 150 is moving both from left to right and from right to left.

By adjusting the vertical position of the printhead platform 150 after each layer is fabricated, the distance between the dispenser and energy source and the facing surface 106 remains constant from layer-to-layer during the manufacturing process. Moreover, in some implementations the vertical position can be adjusted as the printhead platform 150 scans across the platen 105 for fabrication of a layer, e.g., to compensate for non-uniformity of the surface of the platen 105 or of the layer thickness, or to increase the throughput of the build process.

Figure 2A:
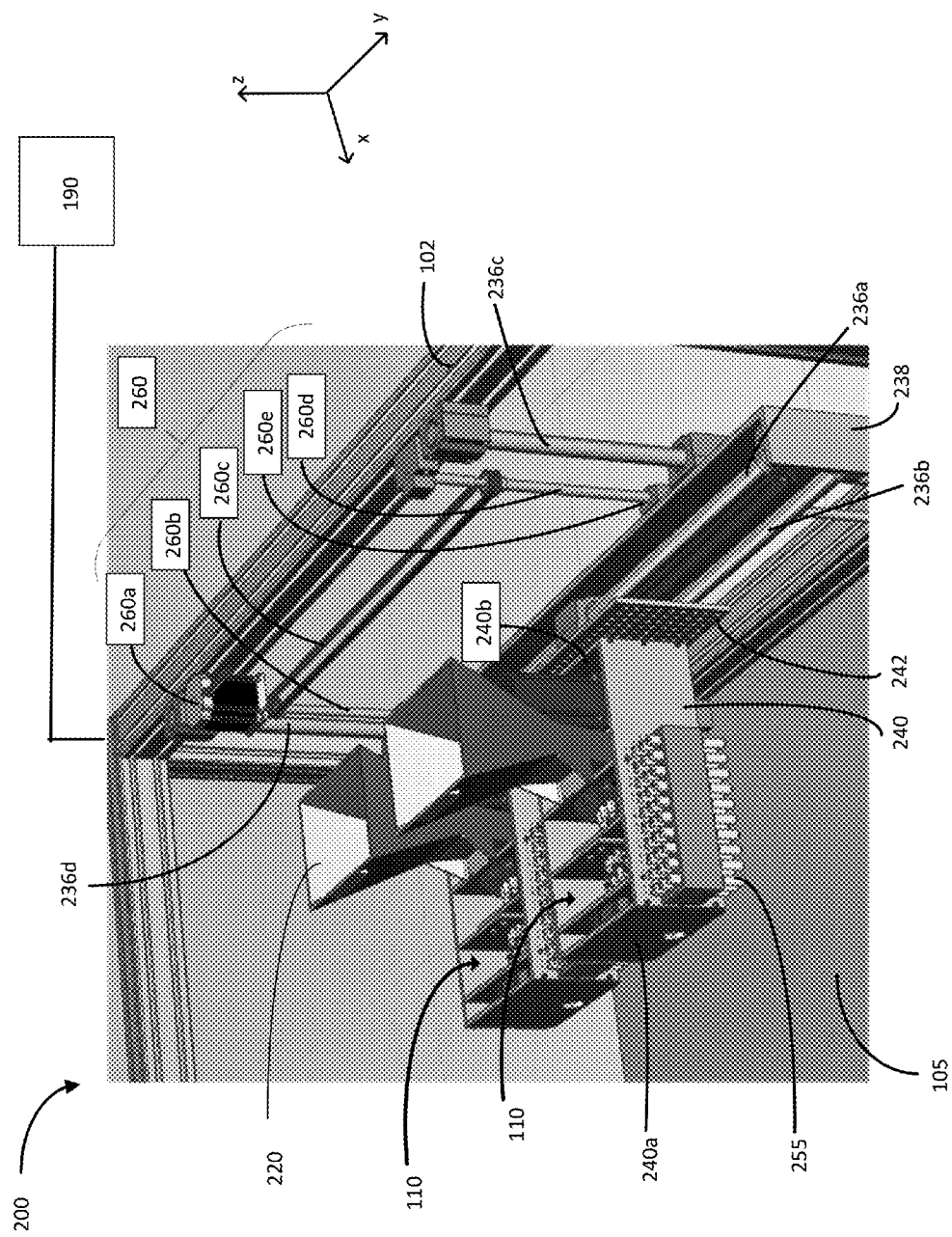
FIG. 2A is a perspective view of an exemplary additive manufacturing system.
Figure 2B:
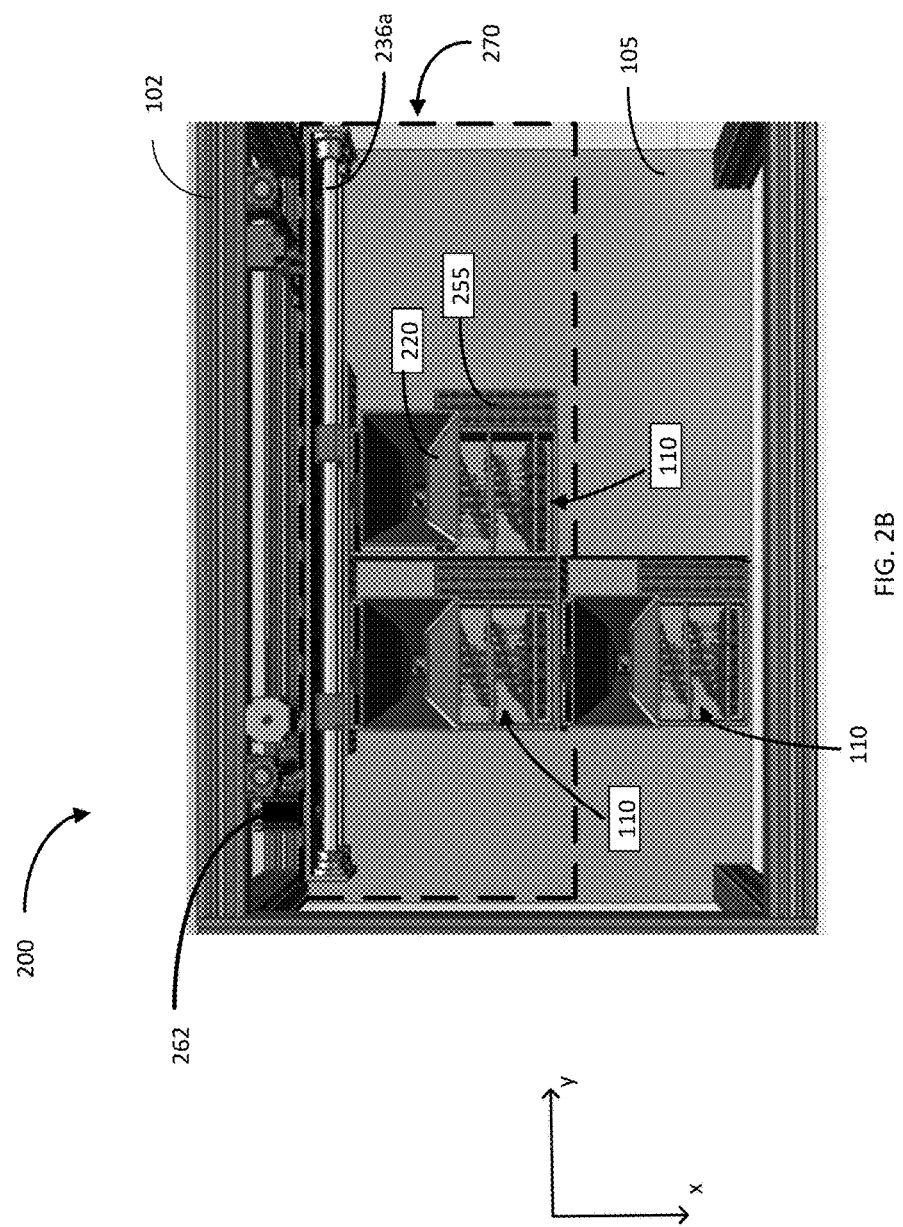
FIG. 2B is a top view of the additive manufacturing system illustrated in FIG. 2A.

FIGS. 2A-2B illustrate a schematic of an exemplary additive manufacturing system 200 in which the printheads modules are held in a cantilever arrangement over the platen. That is, the printheads is supported on only one side rather than at both edges.

The chamber 101 is not shown in FIGS. 2A-2B, but can be present. The system 200 includes a printhead module 110 (arranged along the y-axis) that carry out the manufacturing process on a platen 105. Like FIGS. 1A and 1B, the printhead module 110 in system 200 are configured to move across the platen 105 (along y-direction) and perpendicular to the surface of the platen 105 (along z-direction). It is desirable to move the modules 110 towards and away from the platen 105 for reasons similar to those described with regards to FIGS. 1A and 1B.

The printhead module 110 can comprise a hopper 220, a frame 240 and heat lamp array 255 (details of the printhead module 110 and its operation during an additive manufacturing process will be described in FIG. 5). The hopper 220 holds the feed material that is dispensed on the platen 105 by the dispenser in the printhead module 110. Frame 240 includes a first side panel 240a and a second side panel 240b. The second side panel 240b is removably attached to a vertical support plate 242 which is coupled to horizontal supports 236a and 236b such that the support plate 242 can be driven by an actuator 262 (shown in FIG. 2B) to slide along the horizontal supports 236a and 236b (along y-axis). The horizontal supports 236a-b are attached to a horizontal frame 238. Together, the printhead module 110, the vertical support plate 242, horizontal supports 236a-b and the horizontal frame 238, constitute the printing arrangement 270 (shown in FIG. 2B)

In some implementations, another printhead module 110 (shown in FIG. 2B) can be removably attached to the printhead module 110 (shown in FIG. 2A) along the first side panel 240a to extend along the x axis. For example, the side panel of one printhead module can abut and be secured to the side panel of another printhead module. Such an arrangement can allow the manufacturing process to occur on portions of the platen (along the x direction) that were not accessible by a single printhead module 110 attached to the vertical support plate 242.

The printing arrangement 270 (see FIG. 2B) can be configured to move towards or away from the platen 105 during the manufacturing process. For example, if the surface of the platen 105 is arranged in the x-y plane, the printing arrangement 270 can be configured to move along the z-axis. This can be achieved, for example, by coupling the horizontal frame 238 to vertical supports 236c and 236d such that the printing arrangement 270 can be driven by a drive system 260 to slide along the vertical supports 236c-d.

The drive system comprises an actuator/motor 260a that drives a shaft 260b. A portion of the shaft 260b can be in a threaded engagement with a threaded aperture through the frame 238 (the aperture is obscured in FIG. 2A), such that when the shaft 260b rotates, the frame 238 is driven up or down (on the z-axis) along the supports 236c, 236d.

Alternatively or in addition, the drive shaft 260b can be coupled by a linkage 260c, for example, a belt or a chain, to separate shaft 260d. A portion of the shaft 260d can be in a threaded engagement with a threaded aperture 260e in the frame 238, such that when the shaft 260d rotates, the frame 238 is driven up or down along the supports 236c, 236d. The drive system 260 can be configured such that the printing arrangement 270 can be moved vertically with step-size ranging from nanometer to microns to millimeter.

FIG. 2B is the top view of the system 200 described in FIG. 2A. A second motor 262 is located behind the printing arrangement 270 that drives the printhead module 110 along the y direction. The system 200 can also include a mechanism (for example, an actuator or a motor) that can move the printhead module along the x-axis.

As shown in FIG. 2A, two printhead modules 110 are arranged along the y-axis. Having two printhead modules arranged in this manner can allow the deposition and processing of two layers of feed material for every pass of the printhead modules 110 across the platen 105. It can also allow the printing arrangement 270 to carry out manufacturing process over a larger area. This can reduce the manufacturing time. However, there could be just one printhead module along the y-axis.

By adjusting the vertical position of the printhead module(s) 110 after each layer is fabricated, the distance between the dispenser and energy source and the facing surface 106 remains constant or can be adjusted from layer-to-layer during the manufacturing process. Moreover, in some implementations the vertical position can be adjusted as the printhead module(s) 110 scan across the platen 105 for fabrication of a layer, e.g., to compensate for non-uniformity of the surface of the platen 105 or of the layer thickness.

Figure 3:
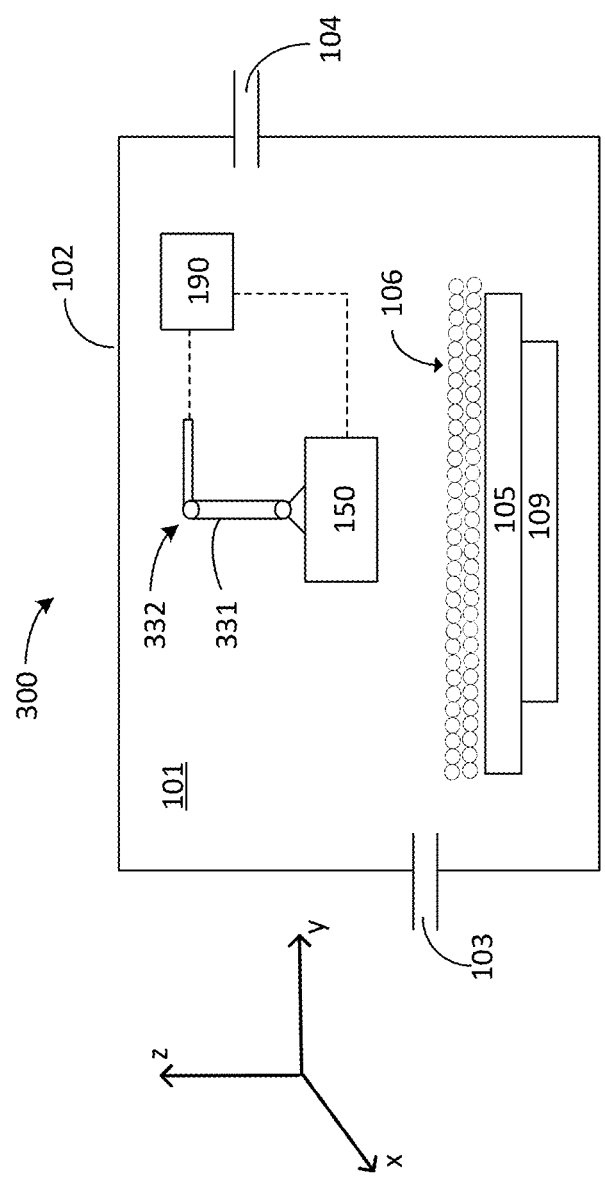
FIG. 3 illustrates a schematic side view of an exemplary additive manufacturing system.

In FIG. 3, the printhead platform 150 is attached to a robot arm 331 of a robot 332 that can move the printhead platform 150. At a minimum, the robot 332 is a three-axis robot capable of moving the platform 150 over the platen 105 (in the x-y plane) and towards or away from the platen 105 (along z-direction). In some implementations, the robot 332 is a six-axis robot with six degrees of freedom of motion of the platform 150, i.e., translation along any of the x, y and z axis and rotation about any of the x, y and z axes.

Again, each printhead module 110 (see FIG. 1B) can be removably mounted on the platform 150. The motion of the robot arm 331 is controlled by the controller 190. As described in FIGS. 1A and 1B, the printhead platform 150 can be moved along the z direction during the manufacturing process to ensure that the distance between the printhead platform 150 and the portion of the facing surface 106 that lies below (along −z direction) the printhead platform 150 remains constant from layer-to-layer during the manufacturing process. Moreover, in some implementations the vertical position can be adjusted as the printhead platform 150 scans across the platen 105 for fabrication of a layer, e.g., to compensate for non-uniformity of the surface of the platen 105 or of the layer thickness.

Figure 4:
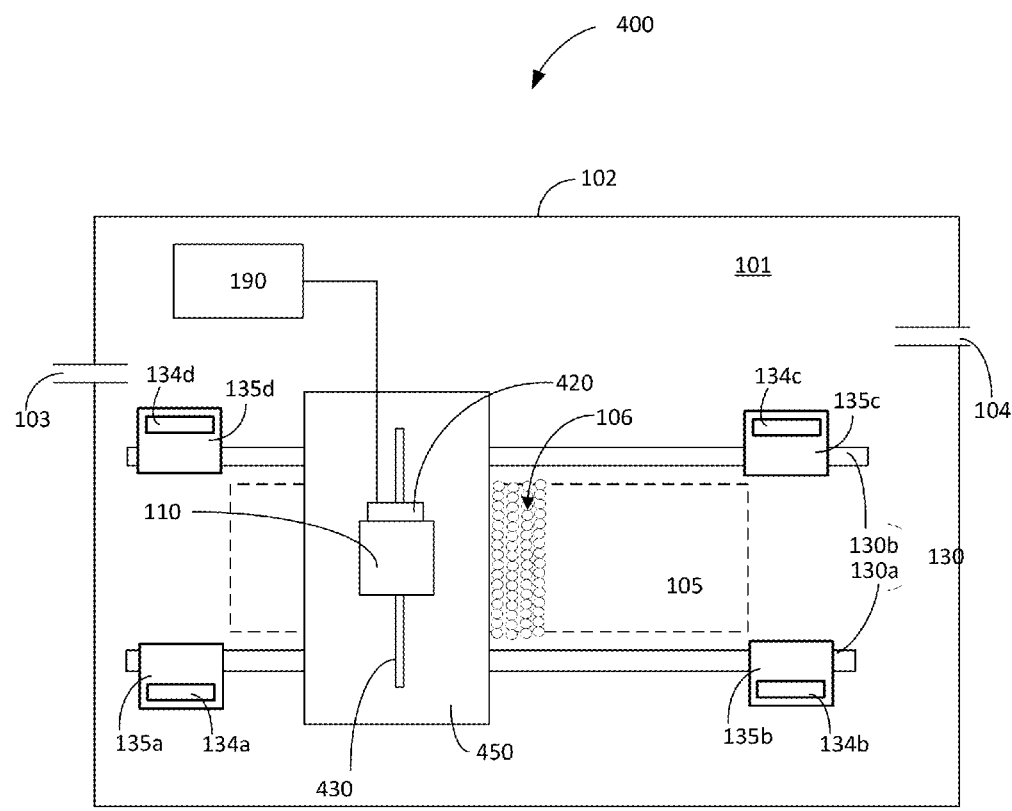
FIG. 4 illustrates a schematic of an exemplary additive manufacturing system.
Figure 4:
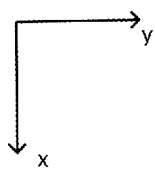

FIG. 4 illustrates a top view of an example of an exemplary additive manufacturing system 400. Similar to the system described in FIGS. 1A and 1B, system 400 includes and is enclosed by a housing 102. The housing 102 can, for example, allow a vacuum environment to be maintained in a chamber 101 inside the housing.

Alternatively the interior of the chamber 101 can be a substantially pure gas, e.g., a gas that has been filtered to remove particulates, or the chamber can be vented to atmosphere. The gas can enter the chamber 101, from a gas source (not shown), through a gas inlet 103. The gas from the chamber can be removed through a vacuum vent 104. Gas inlet 103 can be connected to an air knife that can be close to the facing surface or can be integrated with printhead platform such that a laminar gas flow is enabled across the facing surface. Vacuum vent 104 can be situated opposite to the air knife.

The printhead platform 450 is slidably mounted on the horizontal supports 130a and 130b, e.g., rails or shafts, of the gantry 130. An actuator system 152 (shown in FIG. 1A) allows the printhead platform 450 to slide along the rails 130a and 130b of the gantry 130 to traverse across the platen 105 (along y direction). The rail 130a is supported by vertical supports 134a and 134b at its ends. The vertical position of the rail 130a on the vertical supports 134a and 134b (along z-direction) can be controlled by actuators 135a and 135b, respectively. Similarly, the vertical position of the rail 130b on the vertical supports 134c and 134d (along z-direction) can be controlled by actuators 135c and 135d, respectively.

The platform 450 supports a printhead module 110. The printhead module 110 is mounted on a track 430 and can move along the tracks in the x direction by an actuator 420. The actuator, and therefore the position of the module 110 in the system 450 can be controlled by the controller 190.

In the additive manufacturing system 400, the printhead platform 450 moves along the length of the platen (y-axis) incrementally. For each incremental motion of the printhead platform 450, the printhead module 110 moves from one end of the platen to another along its width (along the x direction). The controller 190 can coordinate the motion of the printhead platform (along y direction) with the motion of the printhead module (along x direction) such that the printhead 110 is scanned across the entire platen 105. This allows the additive manufacturing process to be performed over the entire platen 105.

Actuators 135a-d and 420 can be controlled by the controller 190. The controller 190 can control actuators 135a-d and 420 such that the distance between the printhead module 110 and the portion of the facing surface 106 that lies below the module 110 (along −z direction) remains unchanged as the module 110 moves over the platen 105 due to coupling of the motion of the platform 150 (along y direction) and the motion of the printhead module 110 (along x direction). Furthermore, the vertical position of the platform 450 can be raised after each layer is deposited and fused so the distance between the printhead module 110 and the portion of the facing surface 106 remains constant from layer-to-layer.

Figure 5:
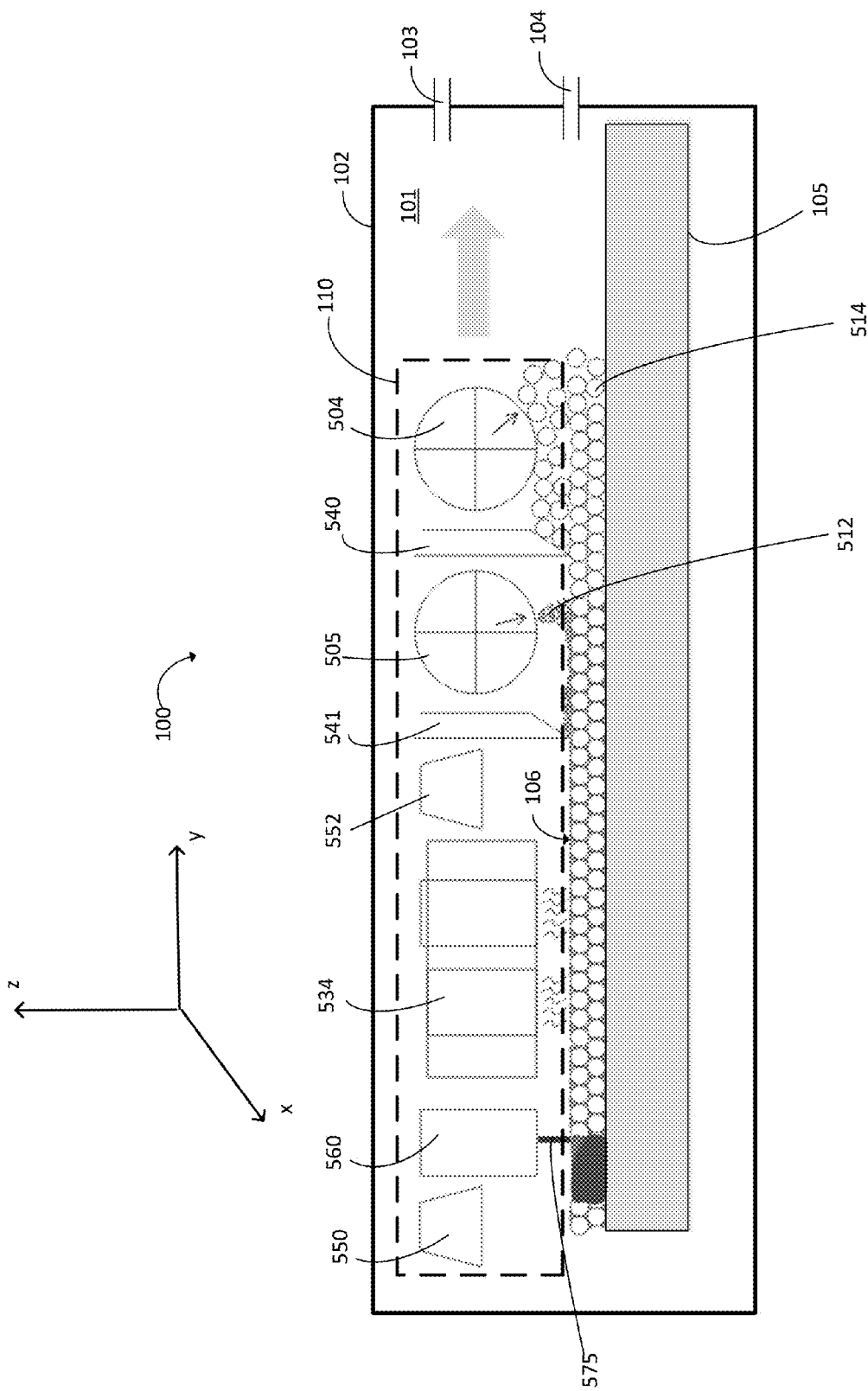
FIG. 5 is illustrates a side view of a printhead module.

FIG. 5 is a schematic illustration of the additive manufacturing process by the printhead module 110. The additive manufacturing system 100 (also described in FIGS. 1A and 1B) includes one or an array of printhead module 110 that can move over the platen 105 (for example, along y direction) and perform the additive manufacturing process. The various printhead components of the printhead module are arranged along the direction of the additive manufacturing process (for example, along +y direction). Additionally, in some implementations the printhead components can move (for example, by an actuator or a motor) relative to the frame of the printhead module. In what follows, the printhead components will be described in the order in which they perform the additive manufacturing process on a given strip of the facing surface 106 of the deposited feed material 514 (and optionally 512) under the printhead module 110 (along −z direction).

The printhead module includes a first dispenser 504 (which is on the leading edge of the printhead module 110) that deposits a first feed material 514. The dispenser 504 comprises of a conduit, for example, a hollow cylinder, that extends across the width of the platen (along x axis) which is substantially perpendicular to the direction in which the printhead module moves (along y direction) during the additive manufacturing process. The conduit is coupled to a hopper (for example, hopper 220 in FIG. 2A) which stores the feed material 514. The conduit encloses a hollow space and an auger. The auger is mounted to the material dispenser, and a motor can rotate the auger (with respect to the conduit), for example, by a drive shaft.

As the auger rotates, it draws in feed material 514 from the hopper. The conduit can have a plurality of openings arranged along its length (along x direction) from which the feed material 514 can be dispensed onto the platen. The rate of flow of the feed material through the openings can be regulated by an actuator which can be controlled by a controller 190 (shown in FIG. 1A). The rate of flow of feed material can also be controlled by changing the rate of rotation of the auger or by replacing the auger by another auger that can allow for greater feed material flow. For example, increasing the rate of rotation of the auger can increase the rate at which feed material is dispensed and vice-versa. In other examples, the conduit can have a continuous slot along the length of the conduit (along x axis).

Optionally, a first spreader 540 (for example, a roller or a blade) follows the dispenser 504 and disperses/smooths the deposited feed material evenly across the platen 105. An optional second dispenser 505 can follow the first dispersion mechanism 540 to deposit a second feed material 512. Feed materials 512 and 514 can be of different sizes or structural properties, and/or can have different material composition. For example, feed material 512 and 514 can have different melting/sintering temperatures. For example, the second feed material 512 can be smaller than the first feed material 514, and may therefore fill the interstitial spaces between the particles of feed material 514. The second feed material dispenser 505 is followed by an optional second spreader 541 (for example, a roller or a blade) that disperses/smoothens the deposited feed materials 512 and 514.

The feed material can be a powder. For example, the feed material can be a powder of particles composed of metal, such as, for example, steel, aluminum, cobalt, chrome, and titanium, alloy mixtures, ceramics, composites, or green sand. Feed material can also include polymeric materials.

An optional metrology system 552 can follow the dispersion mechanism 541, and can comprise one or more of a profilometer, a thermal imager or an optical camera. It can include a sensor, for example, a photoelectric sensor or a laser sensor, that can measure the distance between the portion of the facing surface 106 that lies below the sensor (along −z direction) and the printhead module 110. Metrology system 552 can also, for example, measure the surface roughness of the deposited feed materials. Knowing the roughness of deposited feed material before fusing/melting the feed materials can help in improving the quality of the additive manufacturing process by controlling the manufacturing process.

Next is an optional heat source 534 to raise the temperature of the deposited feed material. In the embodiment described in FIG. 5 the heat source 534 is a heat lamp array. The heat lamp array 534 can heat the deposited feed material 512 (and 514 if present) to a temperature that is below its sintering or melting temperatures. The heat lamp array 534 comprises a plurality of heat lamps that are arranged in an array, for example, a hexagonal closest packed array. The energy delivered to each heat lamp can be controlled by a controller (for example, controller 190). Changing the energy delivered to each of the heat lamp can change the energy radiated by the heat lamp. Therefore, the spatial distribution of energy generated by the heat lamp array can be controlled by the controller. As a result, the portion of facing surface 106 on the platen that receives energy from the heat lamp array 534 can have a temperature distribution. In other words, the heat lamp array 534 can provide control of the temperature distribution of the aforementioned portion of the deposited feed material.

After the heat source 534 is an energy source 560 to fuse selected portions of the layer, e.g., by raising the temperature above its sintering temperature or melting temperature (and then permitting the portion to cool). For example, the energy source 560 can emit a beam 575. The beam 575 can, for example, be a laser beam generated by a laser, an ion beam generated by an ion source, or an electron beam generated by an electron gun. The beam 575 that can raise the temperature of one or both of the deposited feed materials above their respective melting points. Energy source 560 can also produce multiple beams 575 that can melt the feed material.

Moreover, the energy source 560 can be selectively activated in order to selectively fuse desired regions of the deposited feed material. For example, the energy source 560 can emit the beam 575 that impinges certain portion of the facing surface 106, thereby melting one or both the feed material deposited in that portion. Selective heating of certain portions of the facing surface 106 by the energy source 560 can be achieved by moving the energy source 560 relative to the printhead module frame, or by moving the beam 575 over the facing surface 106, or both, in conjunction with selective activation of the energy source 560.

For example, the energy source 560 can move along a direction (e.g., the x-axis) perpendicular to the motion of the printhead module (e.g., the y-axis) by a motor or an actuator that is controlled by the controller 190 (see FIG. 1A). In another example, the energy source 560 may not move relative to the printhead module frame. However, the energy source 560 may include a mechanism, for example, a mirror mounted on a galvo or a piezoelectric micromirror device, which can deflect the beam 575 along the direction perpendicular to the direction of motion of the printhead module. The micromirror device may include a linear array of mirrors that are arranged along the direction perpendicular to the direction of motion of the printhead module. In all the aforementioned cases, the position of impingement of the beam 575 relative to the feed material changes.

Where two feed materials with different melting or sintering temperatures are used, the energy source 560 can raise the entire portion of the facing surface 106 below the printhead module 110 to a temperature between the melting or sintering temperatures of the first feed material and the second feed material. Thus, only one of the feed materials will be fused. This eliminates the need for selective fusing by the energy source 560.

An optional second metrology system 550 follows the energy source 360. The second metrology system 550 can, for example, measure the properties (temperature, surface roughness etc.) of the melted feed material. This can be used by the controller to adjust the process parameters to improve the quality of the additive manufacturing process. The second metrology system 550 can also include a sensor, for example, a photoelectric sensor or a laser sensor, that can measure the distance between the portion of the facing surface 106 that lies below the sensor (along −z direction) and the printhead module 110.

In some implementations of the printhead module 110, the printhead components can be arranged in an order different from that described in FIG. 5. For example, in the order from leading edge to trailing edge, the printhead module 110 can include a metrology system, a first dispenser, a first dispersion mechanism (for example, a roller or a blade), a second dispenser, a second dispersion mechanism (for example, a roller or a blade), a first energy source (for example, a heat lamp), a second energy source (for example, a laser system) and a metrology system.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK), polyurethane, polyester, polylactic acid, PET, polyimide, polymer blends, and polystyrene.

The controller 190 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 190 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 190, e.g., as controlled by firmware or software, can interpret the data object received from the computer to generate the set of signals necessary to control the components of the apparatus 100 to fuse the specified pattern for each layer.

One or more feed material dispensers can deliver one or more feed materials to deposit the layer of feed material, and in some implementations the feed material can be selectively deposited by the one or more feed material dispensers. After the feed material is dispensed onto the platen, a spreader, for example, a roller or a blade, can spread the feed material over the platen. Fusing the desired portions of the layer of feed material can be achieved by supplying energy from one or more energy sources. The energy sources, for example, can be one or more lasers and/or arrays of heat lamps. The arrays of heat lamps can be located above or below the platen or elsewhere in the chamber of the additive manufacturing apparatus. Energy from the energy source heats up the feed material and causes it to fuse together to form a solid piece. The additive manufacturing system can also include one or more metrology systems that measure various parameters of the additive manufacturing process (henceforth called "manufacturing process"), for example, thermal uniformity, surface uniformity, and/or stress of the deposited feed material.

It is desirable to have a standardized printhead module that includes various printhead components, for example, a feed material dispenser, a heat source and an energy source. "Standardized" in this context indicates each printhead module is substantially identical (there can be software exceptions such as serial number or firmware version that vary between dispensers). The standardized printhead module simplifies construction and repair of additive manufacturing systems, e.g., the printhead may be operable as a "plug and play" module that would be operable in any compatible additive manufacturing system. A standardized printhead configuration can also enable scaling of additive manufacturing systems to accommodate the size of the object to be fabricated. The printhead module can move relative to the platen, for example, along the x, y and z Cartesian axes, during the manufacturing process. The platen can be configured to be immovable, i.e., the platen may not move either in the x-y plane or along the z-axis.

A number of implementations have been described. Nevertheless, it will be understood that various modifications may be made. For example, Various components described above as being part of the printhead, such as the dispensing system(s), spreader(s), sensing system(s), heat source and/or energy source, can be mounted on the gantry instead of in the printhead, or be mounted on the frame that supports the gantry.

Instead of the horizontally moving component being supported on the vertically moving component, the vertically moving component can be supported on the horizontally moving component. So, for example, the system could include horizontally extending rails that are fixed in place, and a vertically extending rails that are configured to move horizontally on the horizontal rails.

Rather than having a printhead module, the dispenser and energy source could be directly mounted on the support, e.g., on the platform 150.

Accordingly, other implementations are within the scope of the claims.

What is claimed is:

1. An additive manufacturing system, comprising:
a platen having a top surface to support an object being manufactured;
a support positioned on one side of the platen, the support movable along a vertical axis, the support including a side plate;
a first actuator to move the support along the vertical axis;
a dispenser to deliver a plurality of successive layers of feed material over the platen;
an energy source configured to fuse at least a portion of the feed material;
a frame supporting the dispenser and the energy source, the frame having a side panel fixed to the side plate of the support such that the frame, dispenser and energy source are held in a cantilever arrangement over the platen, wherein the dispenser and energy source are mounted on the frame on the support over the platen such that motion of the support along the vertical axis moves the dispenser and energy source together toward or away from the top surface of the platen; and a controller coupled to the first actuator, dispenser and energy source and configured to cause the first actuator to move the support to lift the dispenser and energy source away from the top surface after each of the plurality of successive layers is delivered.

2. The system of claim 1, wherein the platen is configured to be vertically immobile.

3. The system of claim 1, wherein the controller is configured to cause the first actuator to move the support by distance approximately equal to a thickness of a fused portion of a layer.

4. The system of claim 1, wherein the support is movable along a horizontal axis, the system comprises a second actuator to move the support along the horizontal axis, the controller is coupled to the second actuator, and the controller is configured to cause the second actuator to move the support along the horizontal axis to scan the dispenser across the top surface of the platen while a layer of the feed material is delivered.

5. The system of claim 4, wherein the platen is configured to be horizontally immobile.

6. The system of claim 4, wherein the support is supported on and movable along one or more horizontal rails on one side of the platen.

7. The system of claim 6, wherein the one or more horizontal rails are supported and movable along one or more vertical rails on the one side of the platen.

8. The system of claim 4, wherein the support and actuator comprise a robot having a movable robot arm.

9. The system of claim 8 wherein the robot comprises a 6-axis robot.

10. The system of claim 4, further comprising a roller or blade extending along a second axis and configured to smooth the layer of feed material, and wherein the roller or blade is mounted on the support.

11. An additive manufacturing system, comprising:
a platen having a top surface to support an object being manufactured;
a support that is movable along a horizontal axis, the support including a vertical plate;
an actuator to move the support along the horizontal axis;
a first frame having a first vertical side panel and a second vertical side panel on a side of the first frame opposite the first vertical side panel, the first vertical side panel of the first frame mechanically fixed to the support;
a second frame having a first vertical side panel mechanically fixed to the second vertical side panel of the first frame such that the first frame and the second frame are held in a cantilever arrangement over the platen;
a first dispenser mounted on the first frame to deliver a plurality of successive layers of feed material over the platen;
a second dispenser mounted on the second frame to deliver a plurality of successive layers of feed material over the platen, wherein motion of the support along the horizontal axis scans the first dispenser and second dispenser together along the horizontal axis across the top surface of the platen; and
an energy source configured to fuse at least a portion of the feed material.

12. The system of claim 11, wherein the vertical plate, first frame and the second frame are positioned in order along a line perpendicular to the horizontal axis, such that the first dispenser is configured to deliver the plurality of successive layers of feed material to a first portion of the platen and the second dispenser is configured to deliver the plurality of successive layers of feed material to a second portion of the platen extending parallel to the first portion.

13. The system of claim 12, wherein the energy source comprises a first energy source mounted on the first frame to fuse feed material on the first portion of the platen and a second energy source mounted on the second frame to fuse feed material on the second portion of the platen.

14. The system of claim 12, further comprising a heat source configured to heat the layer of feed material to a temperature below a temperature at which the feed material fuses, and wherein the heat source is mounted on the support.

15. The system of claim 14, wherein the heat source comprises a first heat source mounted on the first frame to heat feed material on the first portion of the platen and a second heat source mounted on the second frame to heat feed material on the second portion of the platen.

* * * * *